(12) United States Patent
Dionisio et al.

(10) Patent No.: US 10,881,242 B2
(45) Date of Patent: Jan. 5, 2021

(54) MACHINE OF THE PISTON TYPE FOR DISPENSING COFFEE OR OTHER BREWED BEVERAGES

(71) Applicant: LA MARZOCCO S.R.L., Scarperia (IT)

(72) Inventors: Andrea Dionisio, Scarperia (IT); Riccardo Gatti, Scarperia (IT); Maurizio Beretta, Scarperia (IT)

(73) Assignee: LA MARZOCCO S.R.L., Scarperia (IT)

( * ) Notice: Subject to any disclaimer, the term of this patent is extended or adjusted under 35 U.S.C. 154(b) by 281 days.

(21) Appl. No.: 15/739,846

(22) PCT Filed: Jul. 7, 2016

(86) PCT No.: PCT/EP2016/066181
§ 371 (c)(1),
(2) Date: Dec. 26, 2017

(87) PCT Pub. No.: WO2017/009186
PCT Pub. Date: Jan. 19, 2017

(65) Prior Publication Data
US 2018/0192811 A1    Jul. 12, 2018

(30) Foreign Application Priority Data
Jul. 10, 2015    (IT) .............................. UB2015A2061

(51) Int. Cl.
*A47J 31/38*    (2006.01)
(52) U.S. Cl.
CPC .................................... *A47J 31/38* (2013.01)

(58) Field of Classification Search
CPC ........ A47J 31/34; A47J 31/36; A47J 31/3604; A47J 31/38; A47J 31/3666
See application file for complete search history.

(56) References Cited

U.S. PATENT DOCUMENTS

| 8,850,956 | B2 | 10/2014 | Bianchi et al. |
| 2007/0227363 | A1 | 10/2007 | Verna |

(Continued)

FOREIGN PATENT DOCUMENTS

| CN | 102595984 A | 7/2012 |
| CN | 203 122 128 | 8/2013 |

(Continued)

OTHER PUBLICATIONS

International Search Report for PCT/EP2016/066181, dated Oct. 5, 2016, 3 pages.

(Continued)

*Primary Examiner* — Christopher J Besler
(74) *Attorney, Agent, or Firm* — Nixon & Vanderhye P.C.

(57) ABSTRACT

A machine (100) for espresso coffee (barley or other beverages) of the piston type is described. The machine comprises a cylinder (1), a piston (2) which is configured to perform a translation movement in said cylinder (1), a rod (4) having an end cooperating with said piston (2), an operating lever (5), a member (6) configured to cooperate with said rod (4) and to move said piston (2) from a first position to a second position by compressing a spring (3), and a mechanism (8, 10, 11, 12) which realizes the connection between said operating lever (5) and said member (6), wherein said mechanism is of the "hold-to-operate" type.

11 Claims, 13 Drawing Sheets

(56) References Cited

U.S. PATENT DOCUMENTS

| | | |
|---|---|---|
| 2007/0277676 A1 | 12/2007 | Crivellin |
| 2011/0048243 A1 | 3/2011 | Bambi |
| 2012/0017767 A1* | 1/2012 | Samso Besora ........ A47J 31/38 99/302 R |
| 2018/0360257 A1 | 12/2018 | Dionisio et al. |

FOREIGN PATENT DOCUMENTS

| | | |
|---|---|---|
| EP | 2 644 066 | 10/2013 |
| FR | 1 174 038 | 3/1959 |
| FR | 1 449 310 | 8/1966 |
| GB | 726 272 | 3/1955 |
| GB | 728 476 | 4/1955 |
| WO | WO 2010/113116 | 10/2010 |

OTHER PUBLICATIONS

International Search Report for PCT/EP2016/066186, dated Aug. 12, 2016, 3 pages.
Office Action dated Dec. 10, 2019 in U.S. Appl. No. 15/739,856.

* cited by examiner

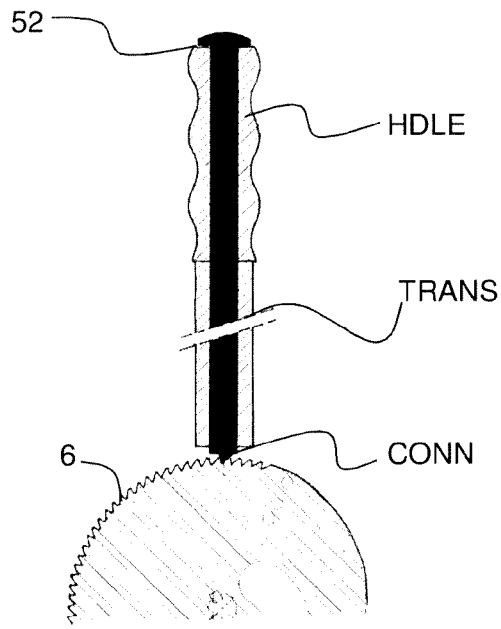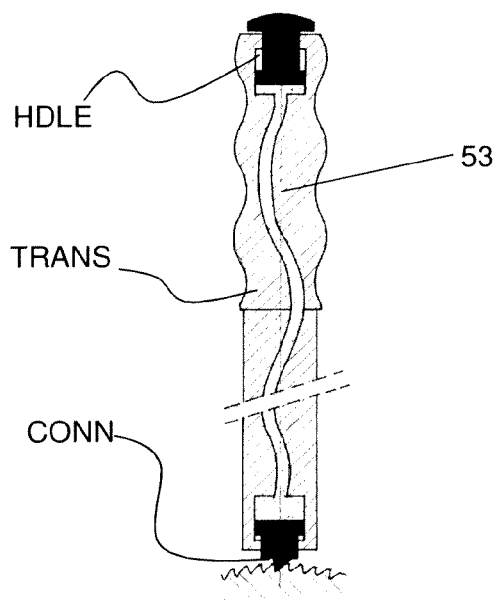
Fig. 3a
Fig. 3b
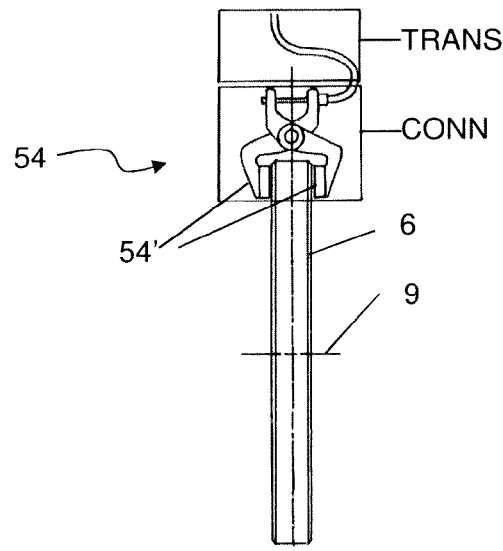
Fig. 3c

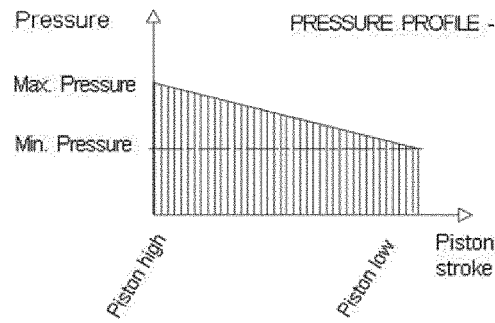
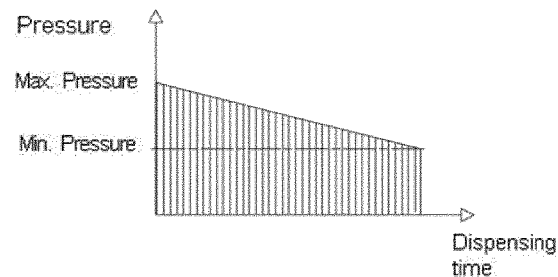
Fig. 6a.1  Fig. 6a.2
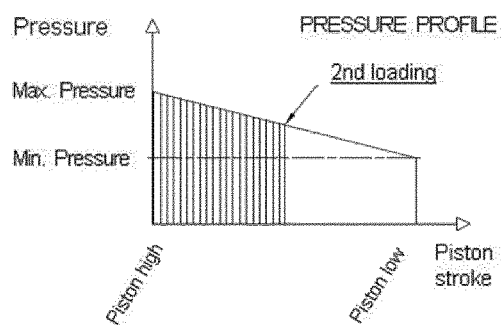
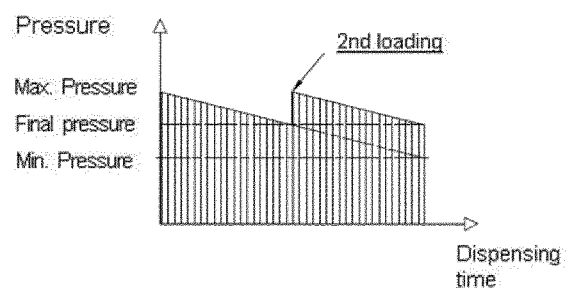
Fig. 6b.1  Fig. 6b.2
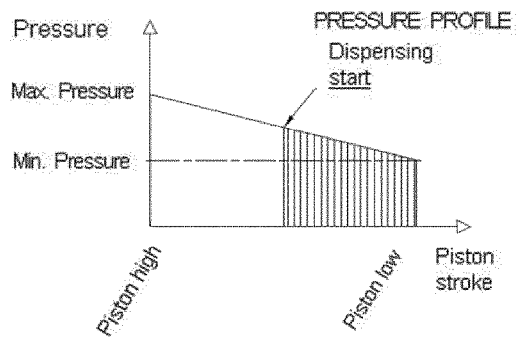
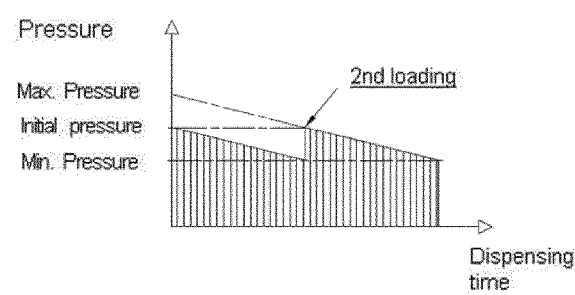
Fig. 6c.1  Fig. 6c.2

MACHINE OF THE PISTON TYPE FOR DISPENSING COFFEE OR OTHER BREWED BEVERAGES

This application is the U.S. national phase of International Application No. PCT/EP2016/066181 filed 7 Jul. 2016, which designated the U.S. and claims priority to IT Patent Application No. UB2015A002061 filed 10 Jul. 2015, the entire contents of each of which are hereby incorporated by reference.

The present invention relates in general to the sector of machines for the preparation of beverages. More particularly, it relates to a machine able to dispense brewed beverages, for example coffee, espresso coffee, barley or other similar beverages. The machine is of the piston type (also known as "lever" type).

Many machines for the preparation of beverages are known. In particular, many machines for the preparation of espresso coffee from coffee powder, pods, capsules or the like are known.

In particular coffee machines of the "lever" or "piston" type are known. These machines typically comprise a system, the purpose of which is to put under pressure the water required for producing the coffee by making use of the energy stored in a spring preloaded by means of a manual action.

Typically a piston machine comprises a cylinder and a piston with a rod. A spring is housed inside the cylinder. The piston is raised against the thrusting force of the spring actuated by an operating lever connected to the piston rod by means of a raising arm. A filling hole with, optionally, a check valve is provided in the cylinder wall. The seal between piston and cylinder is generally ensured by sealing rings.

The pressure profile typically starts with a pressure of between about 9 bar and about 12 bar and ends with a pressure of between about 4 bar and 7 bar.

In a piston machine, the hot water from a boiler enters into the cylinder through the filling hole. Entry of the hot water is possible only when the piston reaches the high position.

As soon as the operator releases the operating lever, the spring (which is no longer retained) pushes the piston downwards, this in turn pushing the water through a puck of coffee powder or the like.

In order to load the spring, it is required to operate the operating lever which causes rotation of the reaction arm (rigidly connected to it) which raises the rod to which the piston is connected. Finally, the piston, being raised, compresses the spring. Therefore the (mechanical) energy stored by the spring is provided by the operator.

The Applicant has noted that the piston machines of the aforementioned type have a number of drawbacks.

Firstly, in the known machines, the operating lever and the raising arm are rigidly connected together and it is not possible to move one without moving the other one.

This characteristic gives rise to a serious risk of injury. In fact, if the lever slips from the operator's hand, owing to the action of the spring, it is pushed violently upwards.

Furthermore, disadvantageously, the sole force which generates the water pressure is that due to the spring. Therefore, the energy required for dispensing of the coffee is entirely due to the spring and, ultimately, is entirely due to the operator.

A further disadvantage consists in the fact that the water may be introduced only when the piston is in the upper position.

During the dispensing step, the spring generates a force decreasing from a maximum valve (when the piston is high) to a minimum value (when the piston is low). The operator may interrupt the downward movement of the piston at any point of its stroke and perform a second filling operation. In this way the operator may obtain dispensing with a medium-to-high pressure. However, the operator may not start dispensing at a pressure value lower than the maximum pressure because, as mentioned above, in order to introduce the water the piston must be arranged at its maximum height. Therefore, it is not possible to obtain dispensing with a medium-to-low pressure.

A further disadvantage consists in the fact the preload of the spring is fixed. There is no possibility for adjustment of the spring preload either in terms of a reduction of the pressure curve or in terms of an increase in the pressure curve. Therefore the pressure curve in a conventional lever machine is fixed and cannot be modified by the operator.

Advantageously, in order to ensure a maximum dispensing pressure higher than 10 bar the conventional systems require a very high lever force (>10 kg).

In piston machines of the known type, the spring, owing to its location, is difficult to replace.

The sealing rings of the piston during the piston stroke pass over the water filling hole formed in the cylinder. The hole forms a discontinuity in the surface of the cylinder which, however small, in the long run causes wear of the sealing rings and creates leakage points.

WO 2010/113116 A1 discloses a machine for preparing coffee. A lever is joined to the plunger by a gear wheel and rack mechanism, so that when the lever is driven upwardly, the plunger moves downwardly until the lever is placed at a 90° angle with respect to the rod. In this moment, clamps 16 of the plunger are engaged to the rod, making possible its retraction when the lever is driven downwardly, and moving the plunger upwardly. After the water suction is carried out, the lever is driven again upwardly, but in this moment the clamps are disengaged, releasing the rod and its plunger. According to this arrangement, during the whole movement of the lever, if the lever is released by the operator, it suddenly springs towards the operator. There is only one single position at which the clamps are disengaged, this being an end limit position. This also does not allow to have less water in the chamber and to load the spring at a low value.

The aim of the Applicant is to provide a machine for dispensing brewed beverages, for example coffee, espresso coffee, barley or other similar beverages, of the piston type which solves the aforementioned safety problem, namely avoids the danger situation which is created when the operating lever accidentally escapes the operator's grip. In particular, the aim of the Applicant is to prevent the operating lever, owing to the action of the spring, from being pushed violently upwards.

According to the present invention, a coffee machine is provided, said coffee machine comprising: a cylinder, a piston which is configured to perform a translation movement in said cylinder, a rod having an end cooperating with said piston, an operating lever (preferably rotatable), a member configured to cooperate with said rod and to move said piston from a first position to a second position by compressing a spring, a mechanism which realizes the connection between said operating lever and said member, wherein said mechanism is of the "hold-to-operate" type. By "hold-to-operate type" in this description and claims it is meant that said operating lever and said member are connected together only by means of a voluntary action which is maintained by an operator of the coffee machine who holds the lever. When the operator releases the operating lever at any position of the lever, the operating lever and the member becomes unconnected. This avoids that, if for any reasons (voluntary or not) the operator leaves the holding of the lever, this becomes unconnected from the member and the lever will not suddenly spring upwardly. This will avoid any risk for the operator or for any person in proximity of him/her.

Preferably, the member is an eccentric member.

Preferably, the eccentric member comprises a body which is rotatable about a rotation axis with a path for a pin configured such that said pin follows a trajectory different from a trajectory of an arc of a circle around said rotation axis.

Preferably, the eccentric member also comprises one or more notches on its periphery.

Preferably, the mechanism comprises a trigger.

The trigger preferably comprises a tooth which is elastically pushed and configured to engage said notches.

In embodiments, the operating lever comprises a handle which is substantially horizontal.

Preferably, the spring and the piston are axially offset such that the axis of said spring forms a non-zero angle with the axis of the rod.

In embodiments, the machine also comprises a member for adjusting the compression of the spring.

The machine may also comprise a connecting piece and a rocker arm. During rotation of the eccentric member, with the aim of filling water in the cylinder, the eccentric member compresses the spring acting on the connecting piece. So that, during this movement, raising of the piston also occurs, it is envisaged that the rocker arm is free to rotate about an axis and is connected to the connecting piece at one of its ends and to the rod at its other end.

The machine may also comprise a pressure gauge for showing the pressure of the dispensed water.

The machine also comprises an opening for introduction of hot water into the cylinder. This opening is arranged above the piston even when the piston is in its uppermost position.

The present invention will become clearer from the following description, provided by way of a non-limiting example, to be read with reference to the accompanying drawings, in which:

FIGS. 3a-3c are schematic illustrations of alternative embodiments of the mechanism which rigidly connects the operating lever to the eccentric member;

Figure 6D:
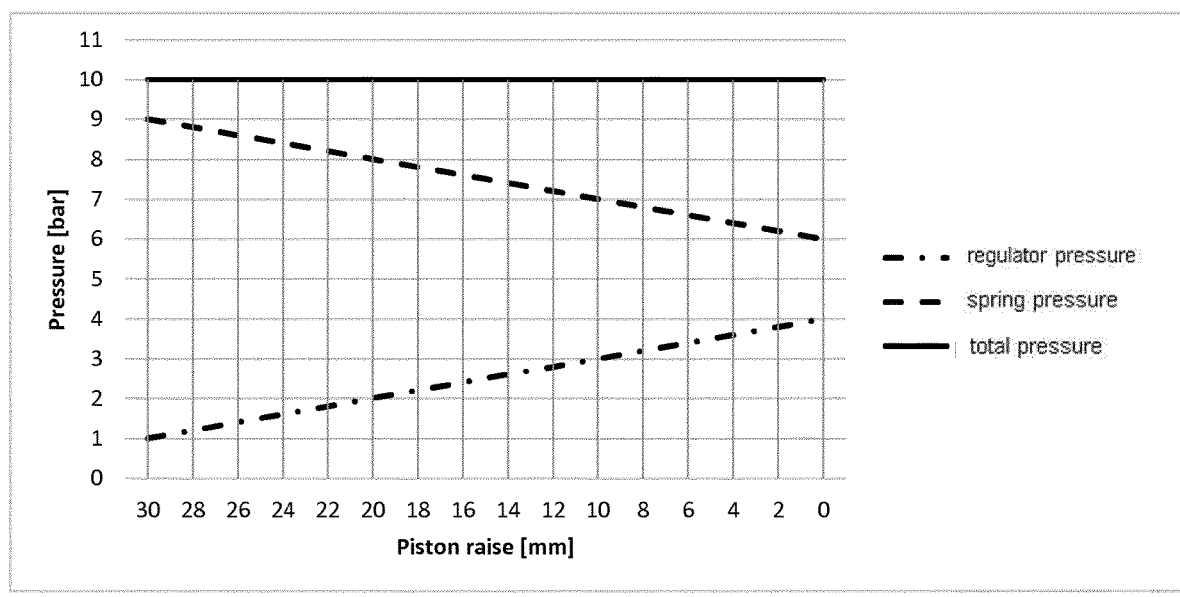
Figure 8:
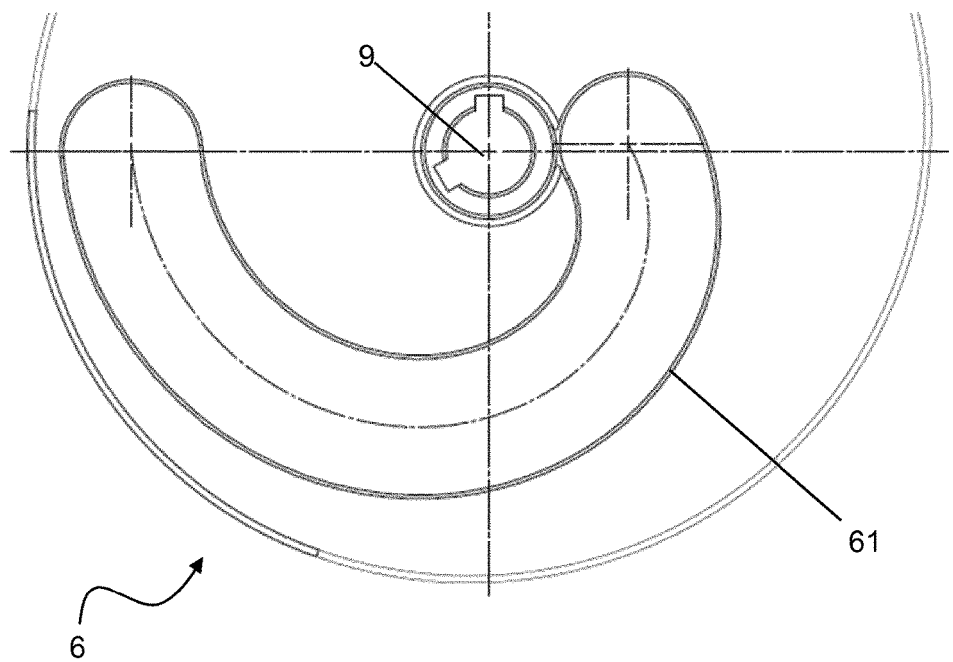
Figure 9:
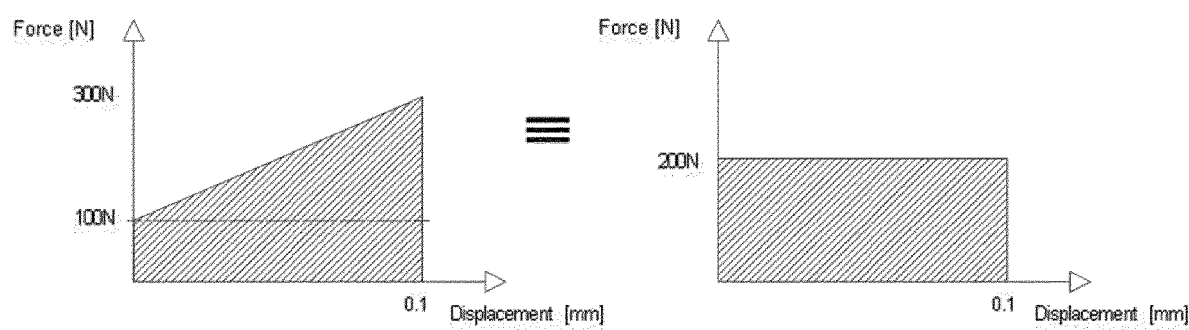
Figure 10:
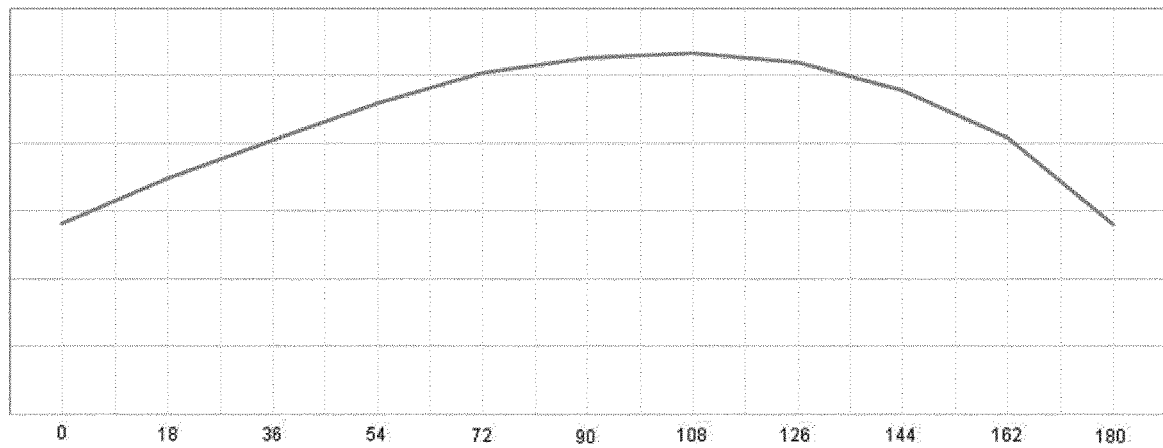
Figure 11:
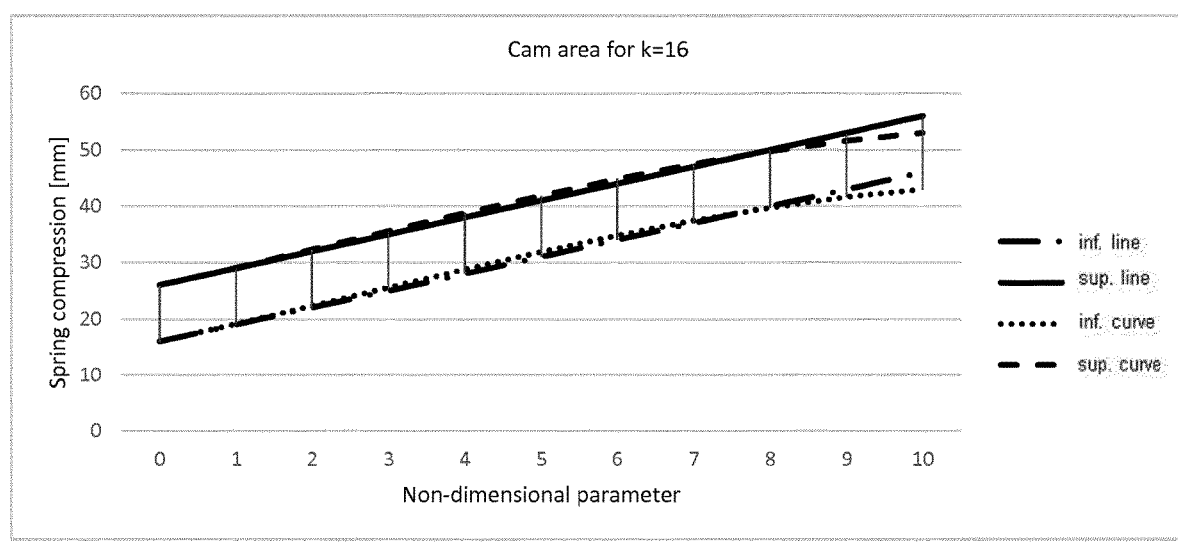

FIGS. 6a.1 and 6a.2 show a first pressure profile which can be obtained with the machine of the present invention;

FIGS. 6b.1 and 6b.2 show a second pressure profile which can be obtained with the machine of the present invention;

FIGS. 6c.1 and 6c.2 show a third pressure profile which can be obtained with the machine of the present invention;

FIG. 6d is an example of manual adjustment for obtaining a substantially constant pressure;

FIGS. 7a, 7b, 7c and 7d show a further embodiment of the machine according to the present invention with spring axially offset from the cylinder;

FIG. 8 shows the path 61 of the eccentric member;

FIG. 9 shows two lever force diagrams which are substantially equivalent;

FIG. 10 shows the qualitative progression of the lever force as a function of the angle of rotation of the eccentric member (or lever); and FIG. 11 shows a qualitative diagram of the profile of the eccentric member.

The description below, solely for the sake of convenience, refers in particular to an espresso coffee machine, but the present invention is not limited to such machines and is applicable to machines for dispensing other beverages. Therefore, the term "coffee", for the purposes of the present description and the claims which follow, must be understood in the widest sense so as to include also barley or the like.

Figure 1:
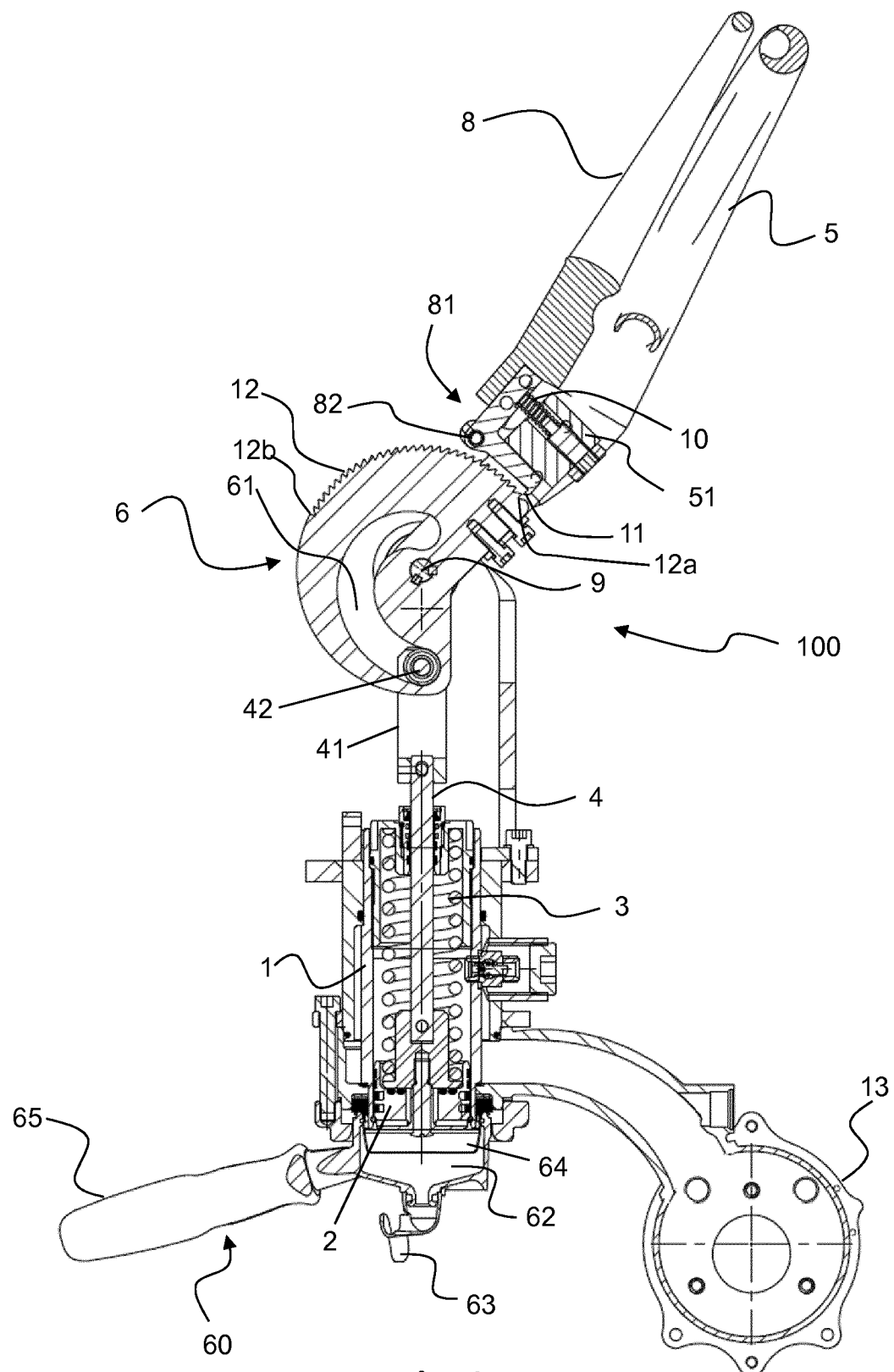
FIG. 1 is a schematic cross-sectional view of an embodiment of the present invention with the piston in its lower position (and the operating lever raised)

FIG. 1 shows a schematic cross-section of a piston machine according to an embodiment of the present invention in the configuration where the piston is in the low position. FIG. 2 shows, again in a cross-sectional view, the same piston machine, but in its configuration where the piston is in the high position. In the description below (and in the claims) terms such as "upper", "high", "lower" and "low" will be used. They are to be understood as being non-limiting, but are used with reference to the figures.

The machine is identified overall by the reference number 100 and comprises a cylinder 1, a piston 2, a spring 3, a rod 4, an operating lever 5 and a boiler 13. In the various figures a filter holder 60 which may be of any known type is also shown. Typically it comprises a hollow body 62 which is provided with a hole at the bottom and which terminates in a (single or double) spout 63. The hollow body 62 is configured to house a filter 64 filled with coffee powder or the like. The filter holder is engaged on a ring of the machine (situated underneath the dispensing chamber) in any known manner, for example with a bayonet mechanism which is rotatably operated (by means of the handle 65).

The operating lever 5 is rotatable about an axis 9 between a first position (FIG. 1) where the piston 2 is situated on the bottom of the cylinder 1 and a second position (FIG. 2) where the piston 2 is at its maximum height inside the cylinder 1. The first position corresponds to the configuration where the machine 100 is at rest or has just completed dispensing of a coffee. The second position is instead the position of maximum compression of the spring 3, before dispensing of the coffee at full pressure. As will become clear below, according to the present invention, intermediate positions are also possible, including that of FIG. 1 and that of FIG. 2.

The rod 4 of the piston 2 is connected, at a first end thereof (called also "bottom end"), to the piston 2. The second opposite end (called also "top end") of the rod 4 of the piston is connected to the operating lever. Thus, a rotation of the operating lever from the position shown in FIG. 1 to that shown in FIG. 2 causes raising of the piston 2 inside the corresponding cylinder 1 and the corresponding compression of the spring 3.

Preferably, the top end of the rod 4 cooperates with an eccentric member 6 which can be associated with the lever 5. According to the embodiment shown in the figures, the rod 4 cooperates with the eccentric member 6 by means of a connecting piece 41 or other similar extension element.

According to the embodiment shown in the Figures, the connecting piece 41 terminates in a pin 42 configured to move in a guided manner within a corresponding path 61 of the eccentric member 6. The path 61 is such that the centre of the pin 42 follows a trajectory different from a circle arc trajectory. In other words, the distance between the rotation axis 9 and the centre of the pin 42 varies during the movement guided within the path 61. The effect of this guided movement is such that the pin 42 moves towards the rotation axis 9 and thus raises the rod 4 (and the piston 2). Obviously, in accordance with the diagram shown in the Figures, the rod 4 performs a translational movement, while the eccentric member 6 rotates.

According to an advantageous aspect of the present invention, the operating lever 5 is not connected to the eccentric member 6 in a permanent manner. Preferably, the operating lever 5 may be rigidly connected to the eccentric member 6 only when wished by the operator and when the operator is applying a sufficient force on the operating lever 5. If the operator releases the grip of the operating lever for any reason, the operating lever and the eccentric member are disengaged, thus preventing the operating lever, which is no longer retained, from performing sudden movements which may cause damage to objects or injury to persons.

According to one embodiment of the present invention, a trigger 8 is provided and, when pressed by the operator, realizes the connection between the operating lever 5 and the eccentric member 6. Preferably, the trigger 8 is in the form of a lever 8, also called "secondary lever", which is pivotably mounted on the main lever 5 in the vicinity of its bottom end.

Figure 2:
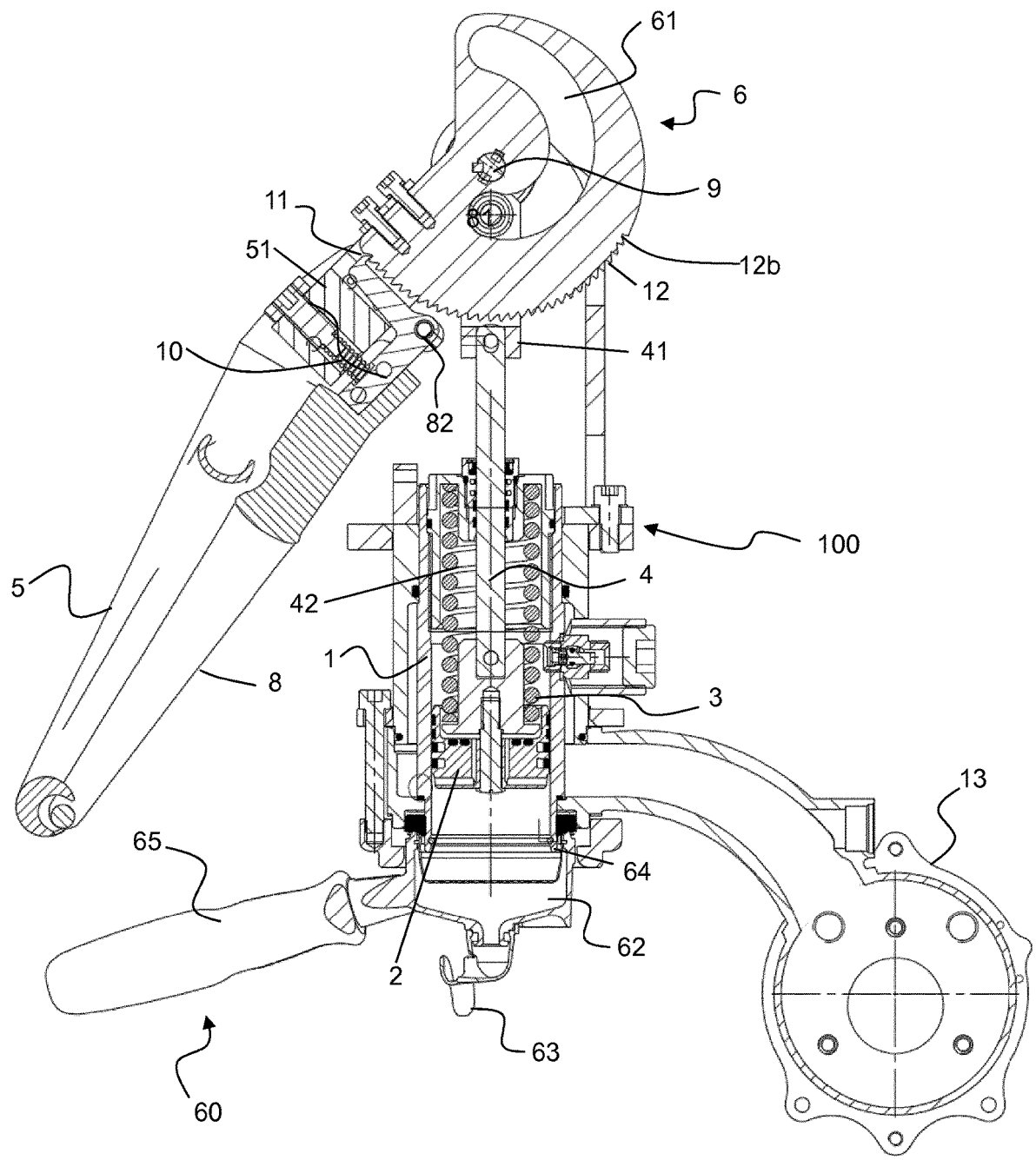
FIG. 2 is a view, similar to that of FIG. 1, but in the condition where the piston is raised (and the operating lever is lowered)

FIGS. 1 and 2 show an embodiment of the mechanism which realizes the connection between the main lever 5 and the eccentric member 6. This mechanism is preferably of the "hold-to-operate" type. In other words, the main lever 5 and the eccentric member 6 may be connected together only by means of a voluntary action which is maintained by the operator.

According to the embodiment shown by way of example in the figures, the main lever 5 and the secondary lever 8 (trigger) are connected together by means of an elastic hinge 81. The hinge 81 comprises an L-shaped element rotatable about an axis 82 of a block 51 at the base of the main lever 5. A tooth 11 is present at the end of a shank of the L. A trigger spring 10, or any other elastic member, cooperates with the other shank of the L which is rigidly connected to the bottom end of the secondary lever 8.

The secondary lever 8 is kept in a configuration removed from the main lever 5 by means of a trigger spring 10, which is preferably weakly loaded.

When instead the main lever 5 and the secondary lever 8 are gripped together by the hand the operator, overcoming the weak resistance of the trigger spring 10, the tooth 11 engages in one of the notches 12 on the periphery of the eccentric member 6. In this way, and for as long as the operator keeps the lever 5 and the trigger 8 close together, the lever 5 is substantially rigidly connected to the eccentric member. Therefore, in this configuration, the rotation of the operating lever 5 about the axis 9 by the operator causes rotation of the eccentric member 6.

The rotation of the eccentric member 6 results in raising of the rod 4 and the piston 2. Therefore, ultimately, the rotation of the eccentric member 6 causes the compression of the spring 3.

If the operator does not grip the main lever 5 and the secondary lever 8 together, the tooth 11 does not engage with the periphery of the eccentric member 6. Therefore, even of the lever is lowered (by rotating it) this movement does not have any effect on the rod of the piston and the spring 3 is not compressed.

If the operator grips together the main lever 5 and the secondary lever 8 and then lowers them, but then, for any reason, accidentally releases his/her grip, neither the main lever 5 nor the secondary lever 8 will return suddenly into the initial position because, when released by the operator, the tooth 11 will cease to engage with the notch 12 of the eccentric member. Therefore, the levers 5 and 8 will be free and not restrained. Only the eccentric member 6 will return elastically owing to the effect of decompression of the spring 3, but this will not cause any injury to the operator.

Preferably, the periphery of the eccentric member 6 comprises one or more notches 12 which can be engaged by the tooth 11. Preferably, the periphery of the eccentric member 6 comprises a plurality of notches 12, as shown in FIGS. 1 and 2. The plurality of notches 12 allows the compression of the spring 3 to be set. In fact, when the tooth 11 engages the first notch 12a, the maximum compression of the spring 3 is obtained; when the tooth 11 engages the last notch 12b, the minimum compression of the spring 3 is obtained; and finally, when the tooth 11 engages the intermediate notch 12, an intermediate compression of the spring 3 is obtained. It is also possible for the operator to cause the tooth to engage with the first notch, but not rotate the lever completely. A degree of compression of the spring 3 in turn corresponds to a pressure for preparation of the coffee. In order to engage an intermediate notch the lever 5 is first rotated through a few degrees without operating the secondary lever and then the two levers 5 and 8 are gripped towards each other so as to cause engagement of the tooth 11 inside the corresponding notch 12.

According to an embodiment of the present invention, an elastic recall member is preferably provided for gently causing the lever 5 (and the secondary lever 8 pivotably mounted on it) to return into the initial position. Preferably the recall force is weak in order to prevent injury to the operator.

The characteristic feature whereby the operating lever 5 and the eccentric member are rigidly connected together by means of a voluntary command which is maintained ("hold-to-operate" type) may also be achieved with mechanisms which are different from that shown in FIGS. 1 and 2.

From a conceptual point of view, the locking mechanism may be divided into three zones: handle, transmission and connection.

"handle" (HDLE) refers to the zone where the operator applies his/her force. "transmission" (TRANS) refers to the portion of the control system which transfers the movement from the "handle" to the "connection". "connection" (CONN) refers to that part of the mechanism which comes into contact with the cam. FIGS. 3a, 3b and 3c show, in a very simplified form, three examples of variants of the locking mechanism.

According to the variant shown in FIG. 3a, the operating lever 5 could be substantially vertical and the handle could in the form of a pushbutton 52.

According to the variant shown in FIG. 3b, the operating lever 5 could be substantially vertical and the transmission could be realized by means of a flexible member 53 such as a cable or a hydraulic pipe.

The connection between the operating lever 5 and the eccentric member 6 may also be realized by means of friction. According to the variant shown in FIG. 3c, a gripper 54 configured to engage the sides of the eccentric member 6 is used. The jaws 54' of the gripper 54 may be operated by means of a cable transmission or in any other known manner.

According to an advantageous embodiment of the present invention, the hot water supplied from a boiler 13 or the like is introduced into the cylinder 1 through an opening which is situated above the piston, both when it is in the low configuration (FIG. 4) and when it is in the high configuration (FIG. 5) where the spring 3 is at its maximum compression.

Preferably, the hot water for preparation of the beverage passes from the boiler 13 through a duct 13a which extends along the wall of the cylinder 1 and enters into the cylinder 1 via a check valve 7 fixed to the wall of the cylinder 1 in a specially provided housing. The path of the water is indicated by means of lines with arrows in FIGS. 4 and 5.

Therefore, in contrast to piston machines of the known type, the pressurized hot water is present above the piston 2. This allows, during dispensing of the coffee, generation of a thrust on the piston in addition to the thrust of the spring 3. This has the advantage of allowing a weaker spring to be used, for the same maximum dispensing pressure. In turn, this results in a lower force applied to the operating lever 5. In fact, the action of the operator has merely the function of compressing the spring 3.

The fact that the discontinuity inside the cylinder 1, due to the presence of the check valve 7 and the corresponding opening 71, is not situated along the stroke path of the piston 2 (but above it) ensures that the piston gaskets or seals do not suffer any damage.

The fact that the pressurized hot water is present above the piston provides a further possibility for adjusting the pressure of the coffee dispensed. In fact, in some embodiments, it is possible to reduce the pressure of the water from the meter so as to supply the machine with a lower pressure. A pressure reducer may be mounted upstream of the machine 100 or may be incorporated inside the machine 100. This second solution is considered to be more advantageous. Moreover, a (for example digital or analog) pressure gauge may be provided for indicating the dispensing pressure to the user of the machine. Advantageously, finally, owing to the presence of the pressure gauge, the operator may dispense the beverage in accordance with the desired pressure profile. The pressure gauge may be connected by means of a hole formed in the cylinder and in the assembly (top of the boiler). In this way it is possible to read the pressure of the water immediately above the puck of coffee.

Figure 4:
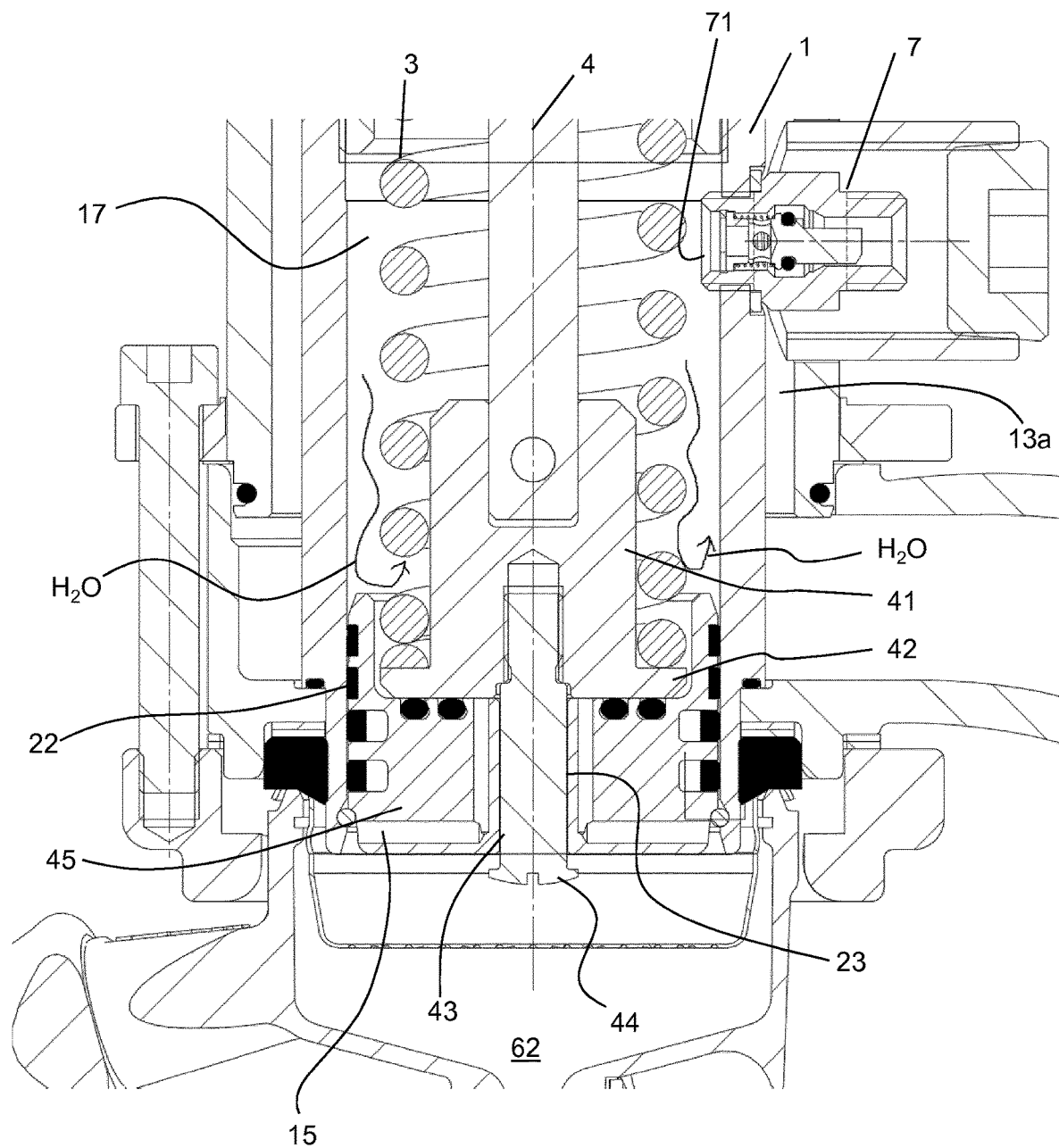
FIG. 4 is a cross-sectional view of the piston in its configuration where it does not allow the passage of water.
Figure 5:
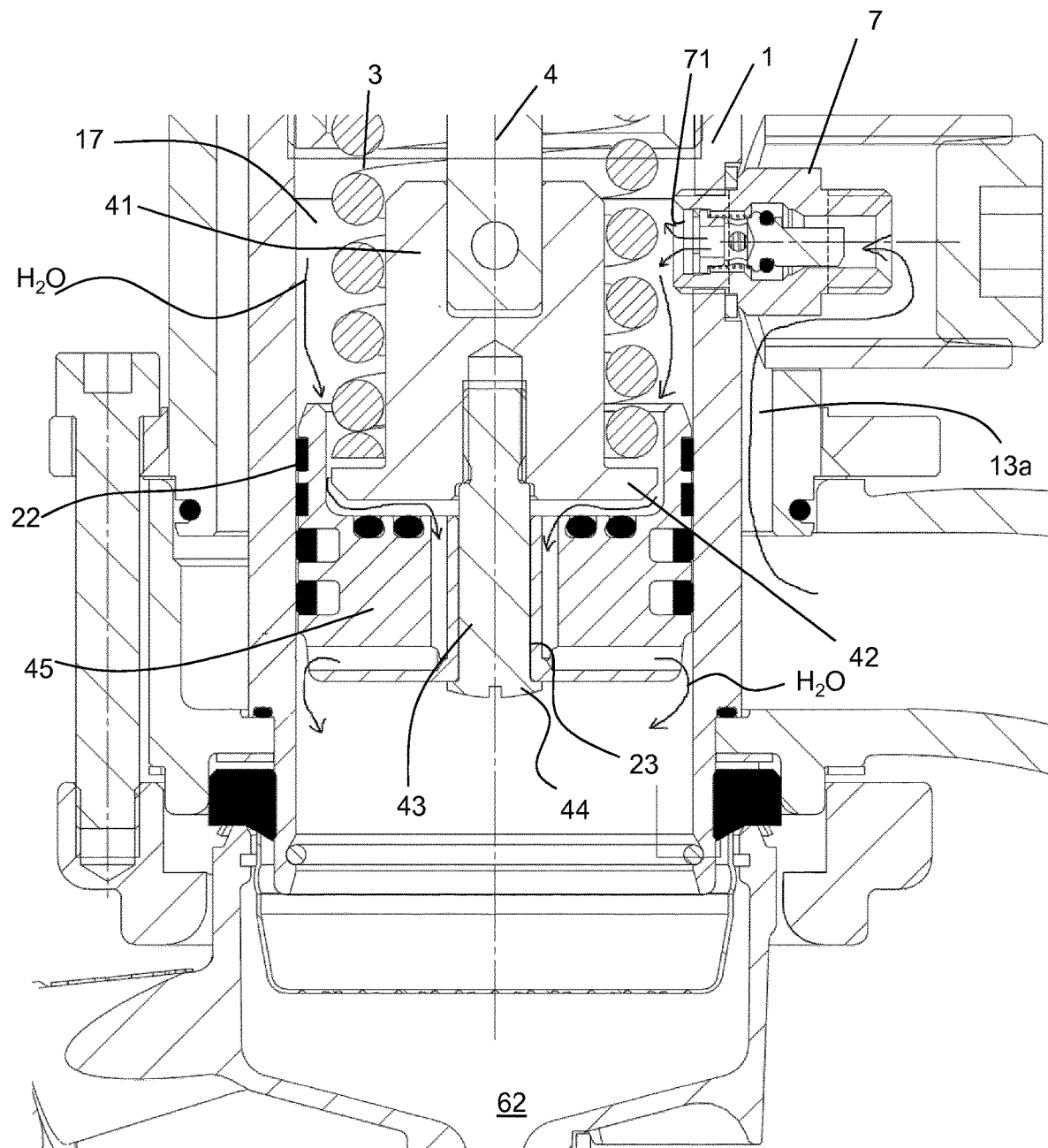
FIG. 5 is a cross-sectional view of the piston in its configuration where it allows the passage of water.

According to an advantageous embodiment of the present invention, the rod 4 and the piston 2 are not rigidly connected together, but a certain relative displacement is allowed. This displacement is schematically illustrated in FIGS. 4 and 5.

Preferably, the rod 4 terminates in an enlarged part 41 and a disk 45. The enlarged part 41 has a greater diameter than the rest of the rod 4. This diameter substantially corresponds to the internal diameter of the spring 3 so as to keep the spring 3 radially in the correct configuration in alignment with the rod 4. The disk 45 retains longitudinally the spring 3 (which is retained above by the top of the cylinder 1). Therefore, the bottom end of the spring 3 rests on the top side of the disk 45. A pin 43 extends underneath from the disk 45. According to one embodiment, the pin 43 is screwed together with the enlarged part 41. The pin 43 terminates at the bottom with a head 44. The head may comprise an incision for engagement by a tool (for example a flat-head or crosshead screwdriver).

The piston 2 is substantially arranged slidably between the disk 45 and the head 44 of the pin 43. Sealing members 22 may also extend above the disk 45 and/or below the head 44. According to one embodiment, the piston 2 has a longitudinal central hole 23 inside which the pin 43 is inserted.

The diameter of the piston hole is preferably greater than the diameter of the pin 43.

Preferably, the height of the piston 2 is smaller than the length of the pin 43.

Preferably, the piston 2 comprises one or more ducts 15 for the passage of water from the top of the cylinder.

Preferably, a sealing member, for example a gasket 14, is provided between the top side of the piston 2 and the bottom side of the disk 45. The gasket 14 may be fixed to the top side of the piston 2 and/or to the bottom side of the disk 45.

In FIG. 4, the rod 4, pushed by the spring 3, presses the piston 2 downwards. Preferably, the gasket 14 is compressed and therefore the passage of the water through the ducts 15 formed in the piston is prevented. Therefore, the pressurized hot water which is present inside the cylinder above the piston cannot pass towards the filter with the ground coffee (or other powder). The path of the water which cannot pass through the piston is shown in schematic form in FIG. 4 with two arrows directed upwards.

FIG. 5 shows instead the configuration where the rod 4 raises the piston 2. The relative displacement of the rod 4 and the piston 2 allows the duct 15 to be freed. In this way, the water which is supplied from the boiler 13 (therefore substantially at the same temperature and the same pressure as the water in the boiler) and which is always present inside the cylinder 1 above the piston 2, passes through the duct 15 so as to reach the puck of ground coffee (or other powder).

Therefore, very advantageously, introduction of the water can be performed with the piston in any position (provided that it is not in the completely lowered position shown in FIG. 4). It is not required to position the piston at the maximum height as in the known machines.

According to the present invention, it is possible to vary the pressure profile without making any adjustments or changes to the machine configuration. With reference to FIG. 6, here below three different categories of profiles are described, i.e. "Standard" (FIGS. 6a.1 and 6a.2), "Strong" (FIGS. 6b.1 and 6b.2) and "Light" (FIGS. 6c.1 and 6c.2). The first two types are also common to other machines, the "Light" profile is an exclusive feature of the present invention.

It is possible to fully load the spring 3 by raising completely the piston 2, waiting for the water to fill entirely the dispensing chamber and then allowing the piston 2 to descend back down completely pushed by the spring. The pressure profile which is obtained is the "Standard" pressure profile shown in FIGS. 6a.1 and 6a.2.

It is also possible to perform dispensing by performing two or more partial water filling operations by raising the piston 2 to its maximum height. In this way a pressure profile is provided where the average dispensing pressure is greater than the "Standard" pressure. The pressure profile which is obtained is the "Strong" pressure profile shown in FIGS. 6b.1 and 6b.2.

It is also possible to perform dispensing by performing two or more partial water filling operations by raising the piston 2 to a height less than the maximum height. In this way a pressure profile is provided where the average dispensing pressure is less than the "Standard" pressure. The pressure profile which is obtained is the "Light" pressure profile shown in FIGS. 6c.1 and 6c.2.

Obviously, intermediate profiles are also possible where the piston does not move up as far as the maximum height and does not move down to the minimum height.

As already mentioned above, the dispensing pressure of the coffee is due to the action of the spring 3 plus the thrust produced by the pressure of the water in the boiler. Therefore, by adjusting the pressure of the water inside the boiler by means of a suitable device which reduces the pressure of the mains water to a set value, it is possible to vary the pressure acting on the coffee.

The pressure reducer could be adjusted by a certain amount, manually during dispensing, for example by means of operation of a knob or electrically during dispensing in order to obtain a preset profile.

FIG. 6d shows an example of manual adjustment for obtaining a substantially constant pressure of 10 bar. If the mains water is about 4 bar, the force of the spring 3 is adjusted so that on its own it exerts a maximum pressure of about 9 bar and the reducer is adjusted is manually so as to generate a pressure which increases between 1 bar and 4 bar. This effect could also be obtained by means of an electric valve programmed to obtain a preset pressure profile.

In addition to the advantages mentioned above, the machine according to the present invention has a high thermal stability. In fact the piston 2 is always in contact with the hot water of the boiler. During filling and dispensing, the boiler water above and below the piston heats the piston at both ends. When the machine is paused (piston in bottom position) the water in the cylinder above the piston heats the piston from above.

Therefore, also during long pauses between two dispensing operations the piston is unable to cool. The temperatures of all the components in the assembly are more stable compared to the conventional systems.

As mentioned above, the water enters into the dispensing chamber via the ducts 15 formed in the piston 2 and not in the zone of the cylinder 1 affected by the passing movement of the piston 2. Therefore the sliding seals of the piston 2 do not encounter any discontinuity on the surface of the cylinder and therefore wear thereof is reduced.

In conventional lever machines it is not possible to dispense a measure of coffee which is different from the measure corresponding to the maximum volume of the water filled in the cylinder. On the other hand, with the machine according to the invention, a different measure, for example a half-measure, may be dispensed. The progression of the pressure as a function of the measure of coffee which can be dispensed is substantially linear. That is, by raising completely the piston (fully compressing the spring), the machine generates a maximum pressure and may dispense a normal measure of coffee (for example about 50 ml of coffee). In order to obtain a half-measure (about 25 ml of coffee) it is sufficient to raise the piston halfway along its stroke.

FIGS. 7a, 7b, 7c and 7d show a further embodiment of the machine 100 according to the present invention. The machine according to FIG. 7 is entirely similar to that shown in the preceding figures and, for the sake of convenience, the same parts (or functionally equivalent parts) have been indicated by the same reference numbers. So as not over-complicate needlessly the present description, the detailed description provided for the first embodiment will not be repeated, but the main differences will be highlighted.

Figure 7A:
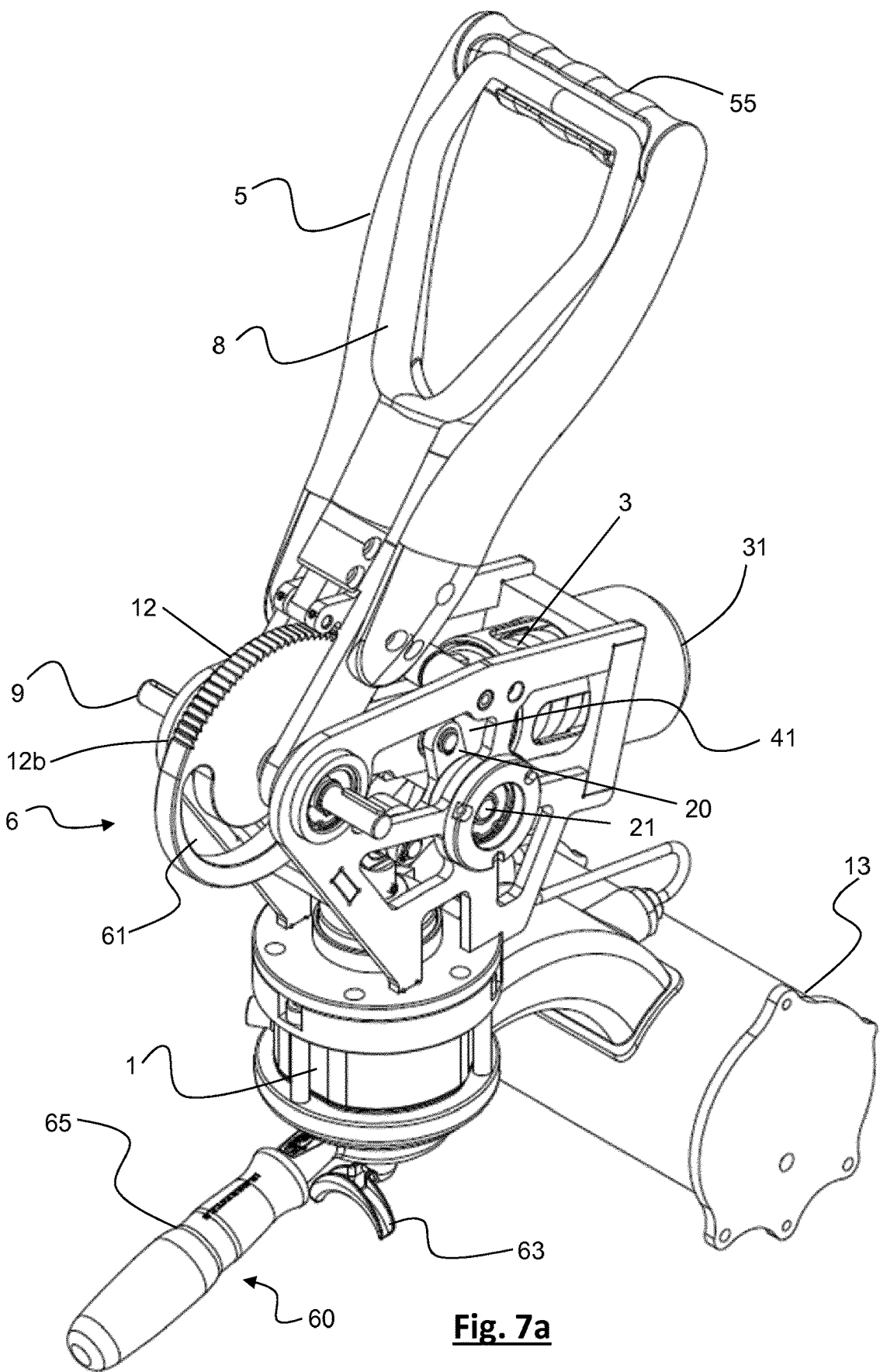
Figure 7B:
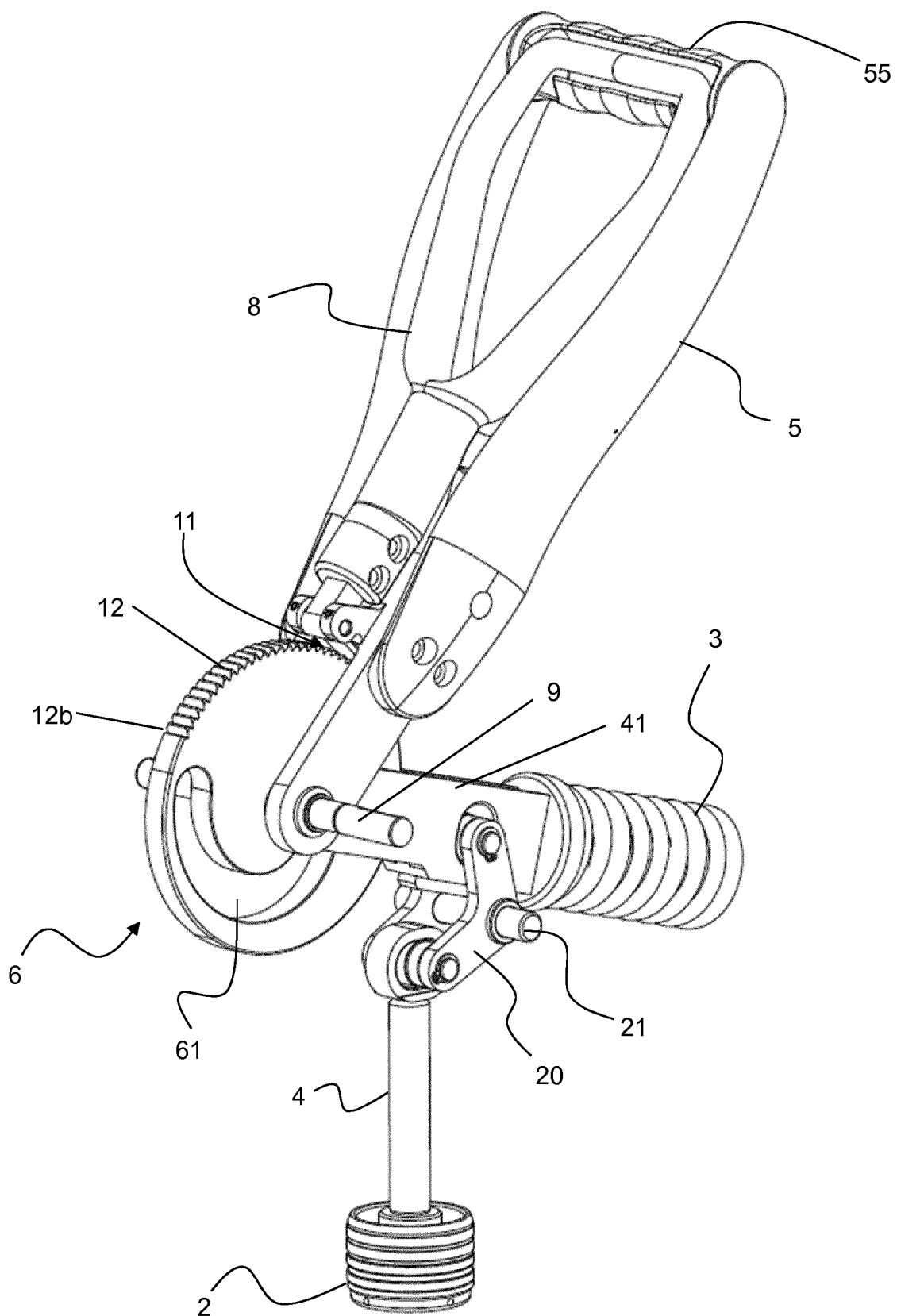
Figure 7C:
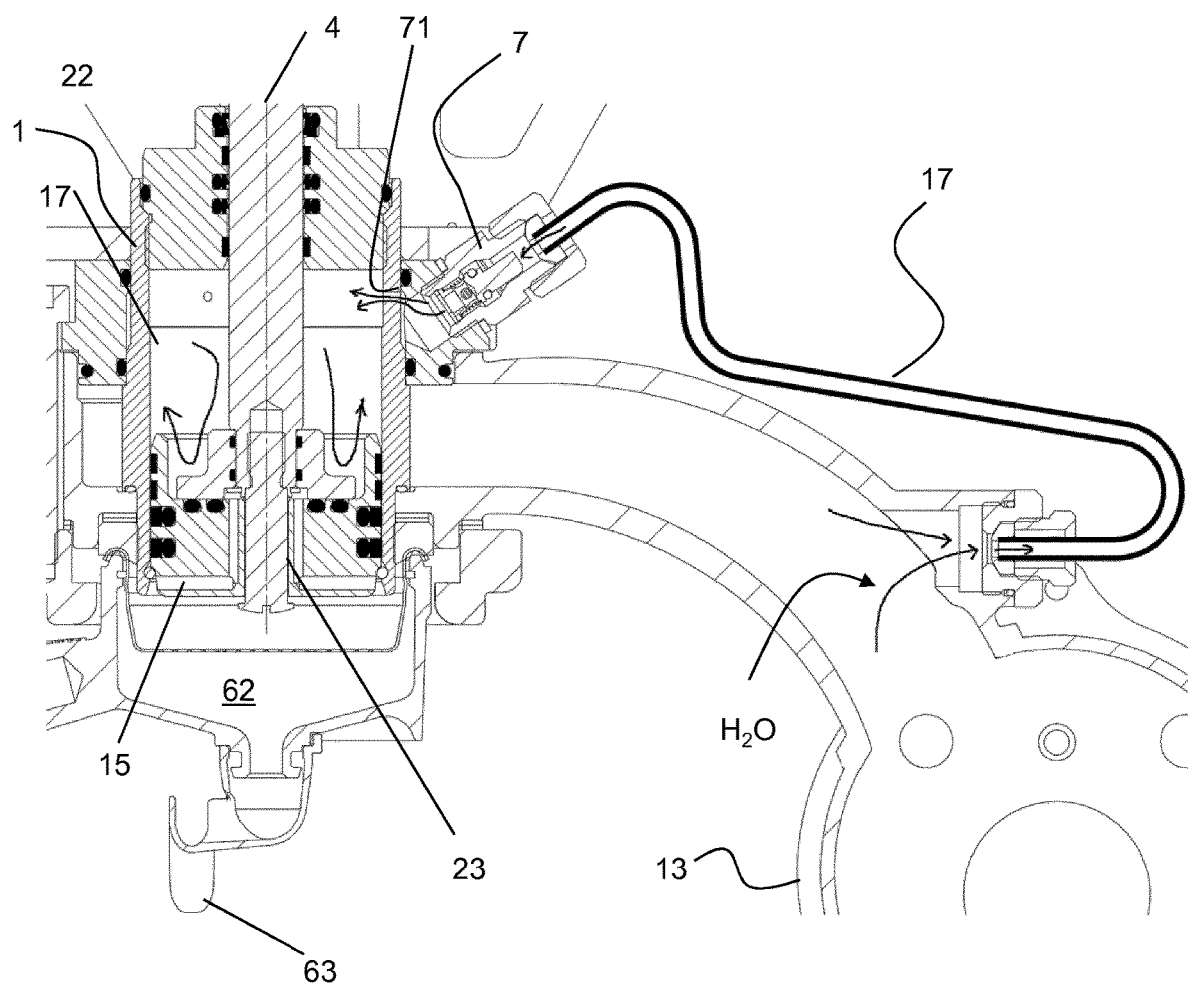
Figure 7D:
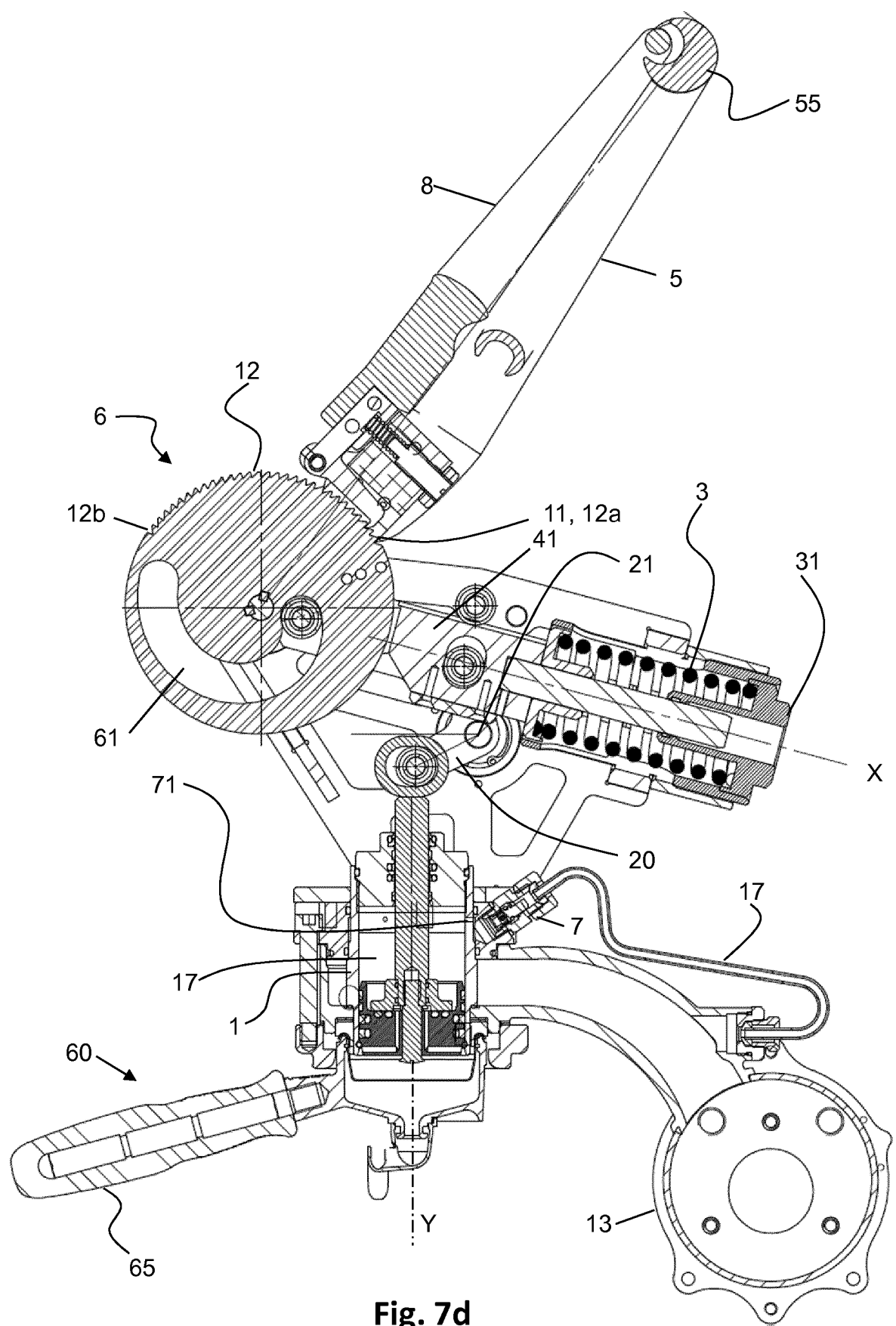

As shown in FIGS. 7a, 7b and 7d, differently from the first embodiment, the spring 3 is not in axial alignment with the rod 4.

During rotation of the eccentric member 6, with the aim of introducing water in the cylinder 1, the eccentric member compresses the spring 3 acting on a connecting piece 41 in a manner not dissimilar to that which occurs in the case described above. However, so that this movement also occurs during raising of the piston 2, a new element called a rocker arm and indicated by the reference number 20 has been provided.

The rocker arm 20 is free to rotate about the axis 21 and is connected to the connecting piece 41 at one of its ends and to the rod 4 at the other end.

During the rotation of the eccentric member 6, in addition to obtaining the retraction movement of the connecting piece 41 which compresses the spring 3, rotation of rocker arm 20 also occurs, this raising the rod 4 of the piston and consequently the piston 2.

Once the trigger 8 has been released at the end of the filling step, the spring 3 is not restrained at all and is therefore free to expand, displacing the connecting piece 41 which rotates the eccentric member 6 and rotates the rocker arm 20. The rotation of the rocker arm 20 lowers the rod 4 which lowers the piston 2.

The entry point for the water inside the cylinder 1 is visible in FIG. 7c. The water heated in the boiler is preferably brought into contact with the outer walls of the cylinder 1. Preferably, the water is introduced into the cylinder via a pipe connected to a check valve. In this second embodiment as well, the entry point for the water is in a position higher than the piston, also when the latter is in the high position. This has all the advantages mentioned above in connection with the first embodiment.

According to the embodiment shown in FIGS. 7, the operating lever 5 has an ergonomic form with a horizontal handle. The horizontal handle has the advantage that no change of grip is required during the operating movement and therefore the risk that the operator will lose his/her grip is kept to a minimum.

Owing to the position of the spring 3 of the machine according to the third embodiment, any replacement of the said spring may be performed more easily. Moreover, the machine is less bulky, especially the height is less and it is therefore easier to lower the operating lever 5.

FIG. 7d shows a body 31 which acts as a housing for the spring 3. Preferably, the housing 31 of the spring is threaded. Advantageously, by screwing or unscrewing it, it is possible to vary the preload of the spring 3. A greater preload produces an increase in the response of the spring, a smaller preload produces a reduction in the response of the spring. Consequently, it is possible to vary the pressure profile.

FIG. 8 shows the travel path 61 of the eccentric member 6. This travel path is configured so that the operator must exert a near constant force during rotation of the operating lever 5.

As is known, the systems for loading a helical spring are devices which convert the rotational movement of the operating lever into a rectilinear movement which compresses the helical spring. The helical spring requires a force so that it is compressed in a manner increasing linearly with the compression. By way of example, the compression of a helical spring of 0.1 m from a value of 100 N to a value of 300 N requires about 20 J of energy. The way of reducing the maximum force applied to the lever 5 is that of applying a constant force. For example, with a displacement of 0.1 m, a constant force of 200 N supplies the spring with an energy of 20 J. Therefore, the left-hand diagram in FIG. 9 is substantially energetically equivalent to the right-hand diagram in the same FIG. 9.

Advantageously, the machine according to the present invention is configured to require an actuating force which is as constant as possible.

The travel path 61 of the eccentric member 6 has a profile designed for this purpose. FIG. 10 shows the qualitative progression of the lever force as a function of the angle of rotation of the eccentric member (or lever) according to the present invention.

The maximum force is only about twice greater than the minimum force. In the known machines the maximum value is more than ten times greater than the minimum value. Typically, the known lever type machines have a maximum value more than 10 times greater than the minimum value.

The cam profile refers to the mathematical function which associates compression of the spring with rotation of the said cam. This function is an increasing monotonic function.

In the description below the parameter relating to rotation has been non-dimensionalized with a variable x comprised between 0 and 10. "x=0" indicates the position of the cam corresponding to the piston in the low position and minimum compression of the spring, while "x=10" indicates the position relating to the piston in the high position and maximum compression of the spring.

Preferably, the profile of the cam is represented by a curve lying between the bottom and top lines of equations, i.e.:

bottom=$3 \cdot x + k$ with: $0 \leq x \leq 10$ and $k \in R$ (set of real numbers)

top=$3 \cdot x + k + 10$ with: $0 \leq x \leq 10$ and $k \in R$ (set of real numbers)

Even more preferably, the profile of the cam is represented by a curve lying between the two bottom and top curves of equations, i.e.:

bottom=$-0.013 \cdot x^3 + 0.1 \cdot x^2 + 3 \cdot x + k$ with: $0 \leq x \leq 10$ and $k \in R$ (set of real numbers)

top=$-0.013 \cdot x^3 + 0.1 \cdot x^2 + 3 \cdot x + k + 10$ with: $0 \leq x \leq 10$ and $k \in R$ (set of real numbers)

FIG. 11 shows a graph of the non-dimensional parameter as a function of the compression of the spring for k=16.

The invention claimed is:

1. A coffee machine comprising:
a cylinder,
a piston which is configured to perform a translation movement in said cylinder,
a rod comprising a first end cooperating with said piston and a second connected to a pin,
an operating lever,
an eccentric member configured to cooperate with said rod and to bring said piston from a first position to a second position by compressing a piston spring, and
a mechanism which selectively connects said operating lever and said eccentric member,
wherein said eccentric member comprises a body which is rotatable about a rotation axis, wherein said body comprises a curved path for the pin which is configured such that, when the operating lever and the eccentric member are selectively connected by the mechanism, said pin follows a curved trajectory in which a distance between a rotation axis of the eccentric member and a center of the pin varies during movement of the pin within the path.

2. The machine of claim 1, wherein said eccentric member further comprises one or more notches at an eccentric member periphery.

3. The machine of claim 2, wherein said mechanism comprises a trigger.

4. The machine of claim 3, wherein said mechanism comprises an elastic hinge with a tooth which is pushed by the elastic hinge to engage said notches.

5. The machine of claim 1,
wherein said operating lever comprises an operating lever handle which is substantially horizontal,
wherein said mechanism comprises a secondary lever comprising a secondary lever handle which is substantially horizontal and a tooth,
wherein the machine comprises a trigger spring with a spring resistance for keeping the secondary lever handle in a configuration removed from the operating lever handle,
wherein when the main lever handle and the secondary lever handle are gripped together, overcoming the trigger spring resistance, the tooth engages a notch on a periphery of the eccentric member, so that the operating lever is substantially rigidly connected to the eccentric member for as long the operating lever handle and the secondary lever handle are gripped together and therefore a rotation of the operating lever causes rotation of the eccentric member.

6. The machine of claim 1, wherein an axis of said piston spring forms a non-zero angle with an axis of said rod.

7. The machine of claim 1, further comprising an adjustment spring for adjusting the compression of said piston spring.

8. The machine of claim 1, further comprising a connecting rod and a rocker arm, wherein the eccentric member is configured to compress the piston spring acting on the connecting rod, and wherein the rocker arm is free to rotate about an axis, the rocker arm comprising a first end connected to the connecting rod and a second end connected to the rod.

9. The machine of claim 1, further comprising a pressure gauge to show the pressure of the dispensed water.

10. The machine of claim 1, further comprising an opening for introduction of hot water into the cylinder, wherein said opening is arranged above the piston even when the piston is in its uppermost position.

11. The machine of claim 1, wherein as the pin travels through the path a lever force applied through the operating lever varies as a function of angle of rotation of the eccentric member about the rotation axis of the eccentric member according to an increasing monotonic function.

* * * * *